(12) United States Patent
Kuras et al.

(10) Patent No.: US 6,385,970 B1
(45) Date of Patent: May 14, 2002

(54) UNDERSPEED CONTROL SYSTEM FOR A HYDROMECHANICAL DRIVE SYSTEM AND METHOD OF OPERATING SAME

(75) Inventors: Brian D. Kuras, East Peoria; Charles E. Rose, Metamora; Kevin J. Lueschow, Elmwood, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/377,723

(22) Filed: Aug. 19, 1999

Related U.S. Application Data (63) Continuation-in-part of application No. 09/136,949, filed on Aug. 20, 1998.

(51) Int. Cl.$^7$ .............................................. F16D 31/02
(52) U.S. Cl. .............................. 60/448; 60/449; 60/491
(58) Field of Search ........................... 60/448, 449, 490

(56) References Cited

U.S. PATENT DOCUMENTS

| | | | | | |
|---|---|---|---|---|---|
| 4,351,152 A | * | 9/1982 | Reynolds et al. | .......... | 60/448 X |
| 4,689,956 A | * | 9/1987 | Hein | .......................... | 60/449 |
| 4,726,187 A | * | 2/1988 | Reinhardt et al. | ............. | 60/448 |
| 4,983,099 A | * | 1/1991 | Tsai | .......................... | 60/448 X |
| 5,070,695 A | * | 12/1991 | Metzner | ...................... | 60/448 |
| 5,177,964 A | * | 1/1993 | Tanaka et al. | ............. | 60/490 X |
| 5,193,416 A | * | 3/1993 | Kanayama | ................ | 60/490 X |
| 5,406,793 A | * | 4/1995 | Maruyama et al. | ....... | 60/449 X |
| 5,473,895 A | * | 12/1995 | Bausenhart et al. | .......... | 60/448 |
| 5,524,436 A | * | 6/1996 | Ishino et al. | ................... | 60/448 |
| 5,553,453 A | * | 9/1996 | Coutant et al. | .......... | 60/448 X |
| 5,576,962 A | * | 11/1996 | Ferguson et al. | ......... | 60/449 X |
| 5,996,343 A | * | 12/1999 | Kuras | .......................... | 60/448 |

* cited by examiner

Primary Examiner—John E. Ryznic
(74) Attorney, Agent, or Firm—John W. Morrison; Steve M. Hanley (57) ABSTRACT

An apparatus for controlling load on an engine is disclosed. The apparatus includes a continuously variable transmission driven by the engine. The apparatus further includes an engine speed sensor being adapted to sense the output speed of the engine and produce an engine speed signal indicative of the engine output speed and a travel speed sensor being adapted to sense the travel speed of the machine and produce a travel speed signal indicative of the machine travel speed. The apparatus yet further includes an electronic controller operable to compare the engine speed signal to an underspeed value and produce an integral error signal indicative of the difference between the engine speed signal and the underspeed value, supply an integral gain value based on the machine travel speed, modify the integral error signal through a proportional plus integral feedback controller to produce an underspeed request signal, and produce a command signal based on the underspeed request signal. The command signal is used to control the transmission ratio of the continuously variable transmission so as to control the load on the engine. A method for controlling a load on an engine associated with a continuously variable transmission is also disclosed.

24 Claims, 6 Drawing Sheets

Fig_6a_

Fig_6_

UNDERSPEED CONTROL SYSTEM FOR A HYDROMECHANICAL DRIVE SYSTEM AND METHOD OF OPERATING SAME

This application is a C-I-P of Ser. No. 09/136,949 filed Aug. 20, 1998.

TECHNICAL FIELD

This invention relates generally to a control system for a drive system that includes an engine and a continuously variable transmission, and more particularly, to a control system for a hydromechanical continuously variable transmission which controls displacement of a pump, displacement of a motor, and engagement of appropriate clutches to regulate engine load.

BACKGROUND ART

Many machines, particularly earth working machines, use a hydrostatic drive system to drive the traction wheels or tracks of the machine. Frequently, the prime mover engine of the machine is set to operate at a predetermined speed via an engine throttle. The machine speed can then be regulated by controlling the displacement of one of the hydraulic elements of the hydrostatic drive system, without adjusting the engine throttle.

One problem common to many known hydrostatic drive systems is that operation of the hydraulic elements produce loads on the engine that causes engine "stalling" or "lugging", a.k.a., excessive engine speed droop thereby decreasing the productivity of the work machine. For most work machines, the operator is required to control the engine load manually by controlling the displacement of the hydraulic elements. However, this is tedious and often difficult. For other work machines, electronic controllers are used to control the displacement of the hydraulic elements in response to engine speed. Such systems may become unstable because the time required to make necessary adjustments to the hydraulic elements is much greater that the time necessary to generate a command signal in response to changes in engine speed.

The present invention is directed toward overcoming one or more of the problems as set forth above.

DISCLOSURE OF THE INVENTION

In accordance with a first aspect of the present invention, there is provided an apparatus for controlling load on an engine. The apparatus includes a continuously variable transmission driven by the engine. The apparatus further includes an engine speed sensor being adapted to sense the output speed of the engine and produce an engine speed signal indicative of the engine output speed and a travel speed sensor being adapted to sense the travel speed of the machine and produce a travel speed signal indicative of the machine travel speed. The apparatus yet further includes an electronic controller operable to compare the engine speed signal to a first underspeed value and produce an integral error signal indicative of the difference between the engine speed signal and the first underspeed value, supply an integral gain value based on the machine travel speed, modify the integral error signal through a proportional plus integral feedback controller to produce an underspeed request signal, and produce a command signal based on the underspeed request signal. The command signal is used to control the transmission ratio of the continuously variable transmission so as to control the load on the engine.

In accordance with a second aspect of the present invention, there is provided a method for controlling a load on an engine associated with a continuously variable transmission. The method includes the steps of sensing the rotational speed of the engine and producing an engine speed signal indicative of the rotational engine speed and sensing the travel speed of the machine and producing a travel speed signal indicative of the machine travel speed. The method further includes the steps of comparing the engine speed signal to a first underspeed value and producing an integral error signal indicative of the difference between the engine speed signal and the first underspeed value. The method yet further includes the steps of determining an integral gain value based on the machine travel speed signal and the integral error and modifying the integral error signal through a proportional plus integral feedback controller to produce an underspeed request signal. The method still further includes the steps of generating a command signal based on the underspeed request signal and controlling the transmission ratio of the continuously variable transmission with the command signal so as to regulate the load on the engine.

BRIEF DESCRIPTION OF THE DRAWINGS

For a better understanding of the present invention, reference may be made to the accompanying drawings in which.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
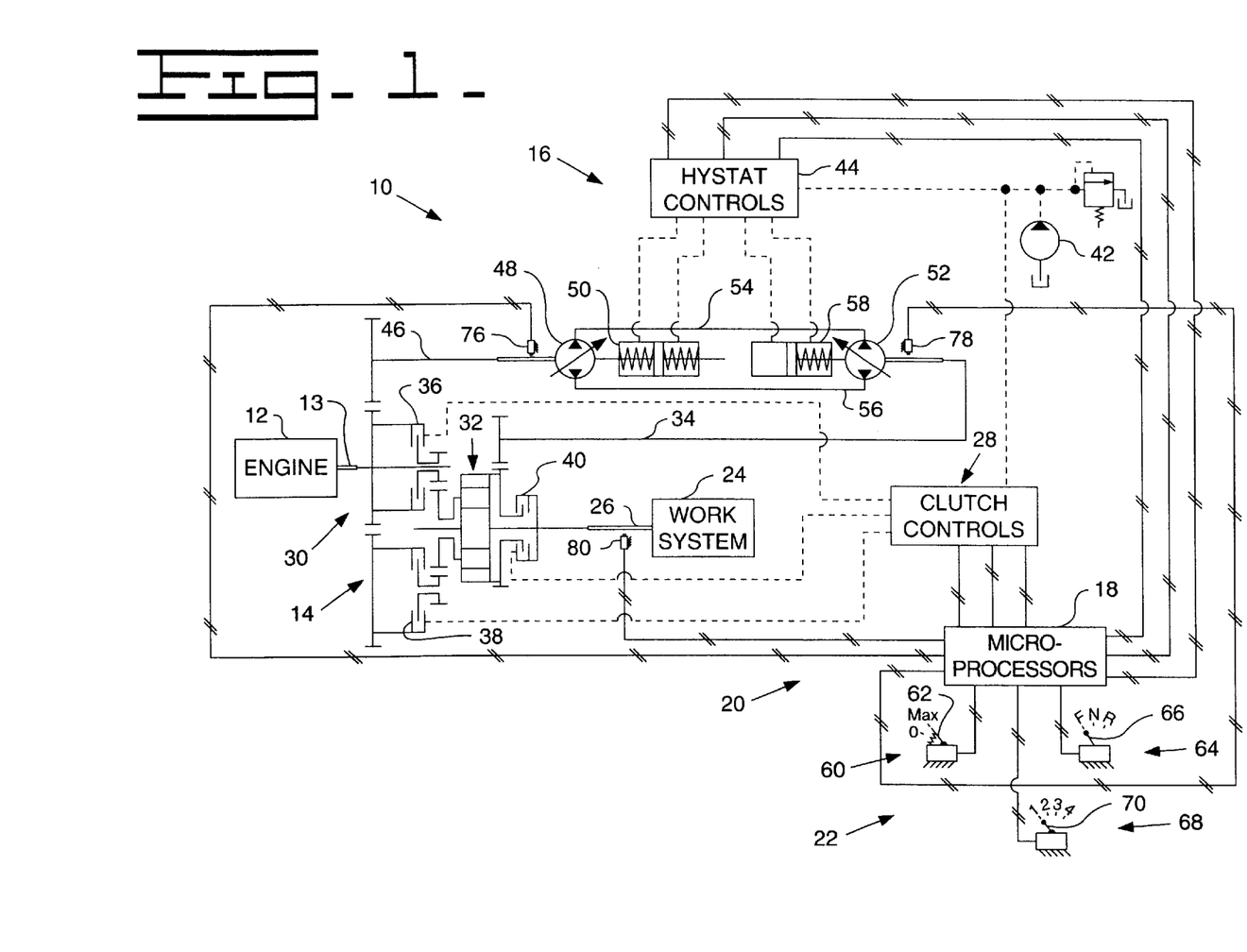
FIG. 1 is a schematic view of a continuously variable transmission which incorporates the features of the present invention therein.

A transmission system 10 is shown for use in a work machine (not shown) having an engine 12. The illustrated transmission system 10 is of the continuously variable type and includes a mechanical transmission 14, a continuously variable transmission 16, a microprocessor based controller 18, a sensing arrangement 20, and a command input arrangement 22. Although the illustrated transmission system 10 is shown to be a hydromechanical continuously variable transmission, the invention is equally applicable to other types of continuously variable transmissions including a hydrostatic, an electric, or an electromechanical continuously variable transmissions. A work system 24 is connected to the transmission 10 via a final drive shaft 26.

The mechanical transmission 14 and an associated clutch control arrangement 28 is operatively connected to an engine output shaft 13 of the engine 12 through a gear arrangement 30. The mechanical transmission 14 includes a summing planetary arrangement 32 operatively connected to both the engine 12 through the gear arrangement 30 and to the continuously variable transmission 16 through a motor output shaft 34. The output of the summing planetary arrangement 32 is connected to the final drive shaft 26. The mechanical transmission 14 also includes directional high speed clutches 36, 38 and a low speed clutch 40. The clutch control arrangement 28 is connected to a source of pressurized pilot fluid, such as a pilot pump 42. The clutch control arrangement 28 is operative in response to electrical signals from the controller 18 to control the engagement and disengagement of the respective speed clutches 36, 38 and 40.

The continuously variable transmission 16 and an associated hydrostatic control arrangement 44 is operatively connected to the engine 12 through a pump input drive shaft 46. The continuously variable transmission 16 includes a variable displacement pump 48 and a pump displacement controller 50 which controls the displacement of the variable displacement pump 48. The continuously variable transmission 16 further includes a variable displacement motor 52 and a motor displacement controller 58 which controls the displacement of the variable displacement motor 52. The variable displacement motor 52 is fluidly connected to the variable displacement pump 48 by conduits 54, 56. The hydrostatic control arrangement 44 is connected to the pilot pump 42 and is operative in response to electrical signals from the controller 18 to control movement of the respective pump and motor displacement controller 50, 58. Varying the displacement of the pump 48 or the motor 52 varies the overall transmission ratio between the final drive 26 and the engine output shaft 13.

The command input arrangement 22 includes a speed input mechanism 60 having a speed pedal 62 moveable from a maximum speed position to a zero speed position for producing a requested machine speed signal, a direction control mechanism 64 having a direction control lever 66 selectively moveable from a neutral position to a forward or a reverse position, and a speed range control mechanism 68 having a speed lever 70 selectively moveable between a first position and a fourth position. A desired machine speed command is based on the requested machine speed signal and acceleration limits of the work machine (described below). The controller 18 includes RAM and ROM (not shown) that store control software. In the preferred embodiment, the software includes a value for the engine governor which represents the desired engine speed. A first underspeed value is based on the desired engine speed and represents the engine speed at which the controller 18 determines that the engine 12 is lugging and the transmission ratio should be varied based on the integral component of the output of a proportional plus integral feedback controller (described below) to reduce engine lugging. A second underspeed value is also based on the desired engine speed and represents the engine speed at which the controller 18 determines that the engine 12 is lugging and the transmission ratio should be varied based on the proportional component of the output of a proportional plus integral feedback controller (described below) to reduce engine lugging.

The sensing arrangement 20 includes an engine speed sensor 76 operative to sense the speed of the pump input shaft 46 and direct an engine speed signal representative of the rotation speed of the engine 12 to the controller 18. A transmission speed sensor 78 is operative to sense the speed of the motor output shaft 34 and direct a motor output speed signal representative of the motor output speed to the controller 18. A travel speed sensor 80 is operative to sense the speed of the final output drive shaft 26 and direct a machine travel speed signal representative of the machine travel speed to the controller 18.

Figure 2:
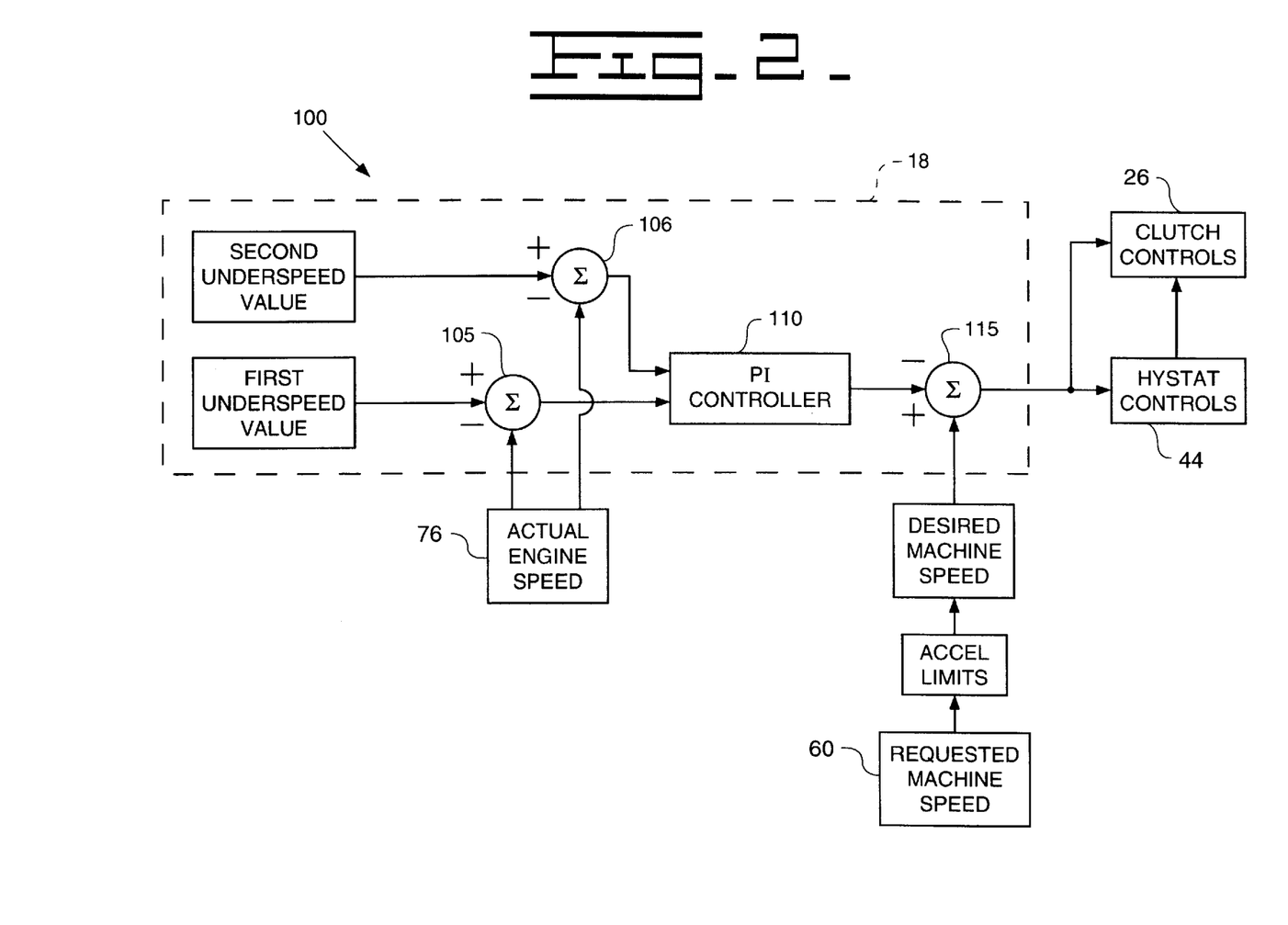
FIG. 2 is a schematic view of an underspeed control employing a proportional plus integral feedback controller.

The present invention is now described with respect to FIG. 2 which shows a logical block diagram of an aspect of the controller 18 that relates to an engine underspeed control 100. The engine underspeed control 100 compares the first underspeed value with the engine speed signal from the engine speed sensor 76 at summing junction 105 and produces an integral error signal indicative of the integral error or the difference between the first underspeed value and the engine speed. The second underspeed value is compared with the engine speed signal at summing junction 106 to produces a proportional error signal indicative of the proportional error or the difference between the second underspeed value and the engine speed. The engine underspeed control 100 further includes a proportional plus integral feedback controller 110. The integral error signal and the proportional error signal are passed through the proportional plus integral feedback controller 110 producing an underspeed request signal having an integral component based on the integral error signal and a proportional component based on the proportional error signal.

The proportional plus integral feedback controller 110 is further operative to apply an integral gain to the integral component of the underspeed request signal and a proportional gain to the proportional component of the underspeed request signal. The integral gain allows the feedback controller 110 to increase or decrease the influence of the integral component of the underspeed request signal whereas the proportional gain allows the feedback controller 110 to increase or decrease the influence of the proportional component of the underspeed request signal.

The underspeed request signal is the subtracted from the desired machine speed command received from the speed input mechanism 60 at summing junction 115 to produce a command. The desired machine speed command is derived from the speed input mechanism 60 with acceleration limits applied to that command (see FIG. 5). The command signal is (i) transmitted to the hydrostatic control arrangement 44 to control the displacement of the respective pump 48 and motor 52 and (ii) transmitted to the clutch controller 28 to engage the appropriate clutches 36, 38, and 40. Controlling the displacement of the pump 48 and the motor 52 and controlling the engagement of the clutches 36, 38, and 40 varies the overall transmission ratio of the transmission system 10. Varying the overall transmission ratio modifies the actual travel speed of the work machine. It should be appreciated that the modified machine speed command is less than the desired machine speed command (see FIG. 6) and thus reduces the load on the engine 12 thereby decreasing the amount of lugging experienced by the engine 12.

Figure 3:
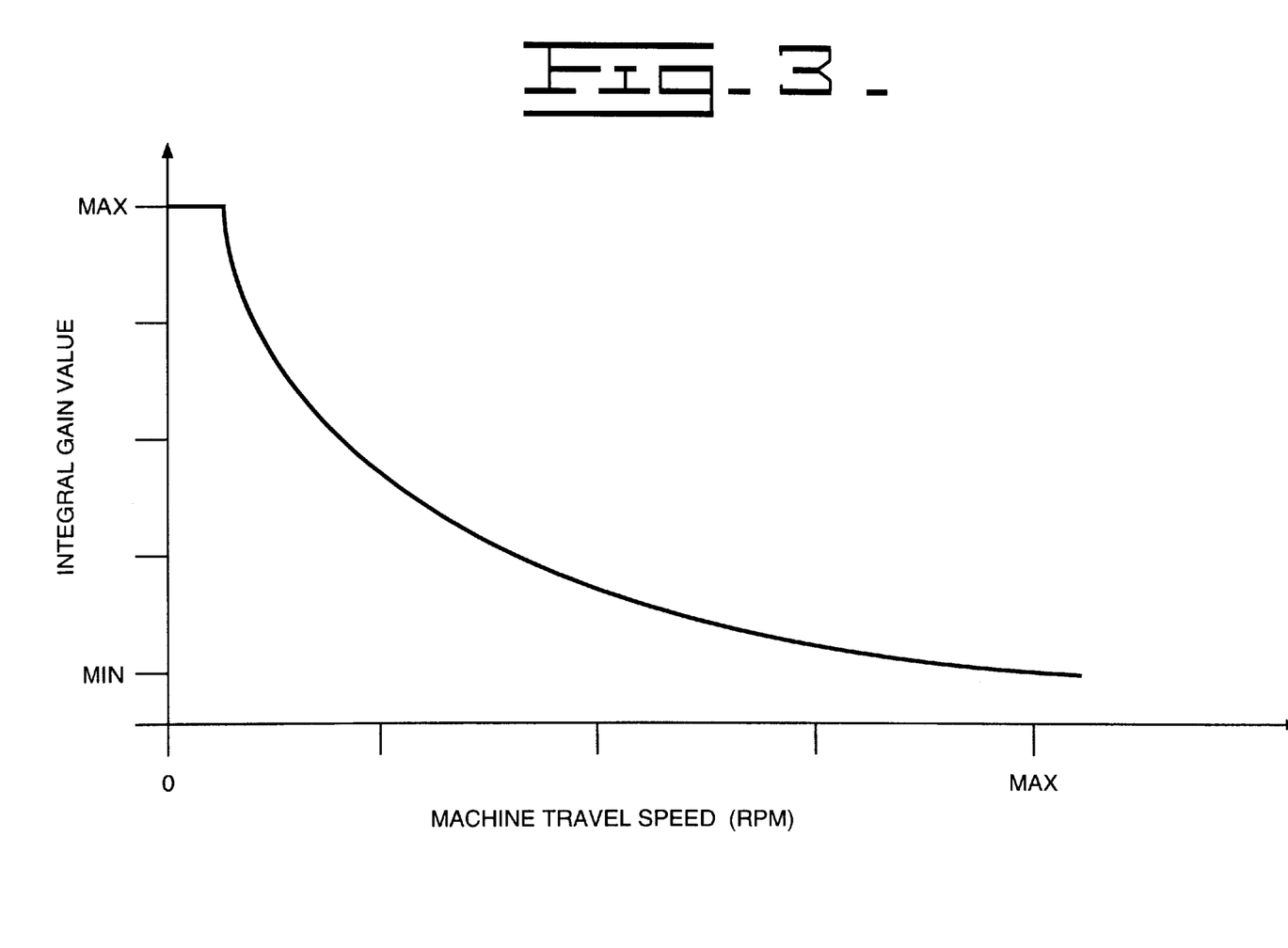
FIG. 3 is a graph of integral gain as a function of machine travel speed.

Referring now to FIG. 3, there is shown a graph of integral gain values used in a first embodiment of the present invention whereby the feedback controller 110 applies an integral gain to the integral component of the underspeed request signal based on machine travel speed. Although the integral gain values are shown as a hyperbolic function, the integral gain values may take a variety of forms in which relatively high integral gain values are used for a relatively slow machine travel speeds and relatively low integral gain values are used for a relatively high machine travel speeds. In the first embodiment, a two-dimensional look-up table of a type well known in the art is used to store the integral gain values shown in FIG. 3. The respective integral gain values for the integral component are determined using root locus and Bode design methods. It should be appreciated that a proportional gain value could also be applied to the proportional component of the underspeed request signal to either increase or decrease the influence of the proportional component of the underspeed request signal on the command signal.

Figure 4:
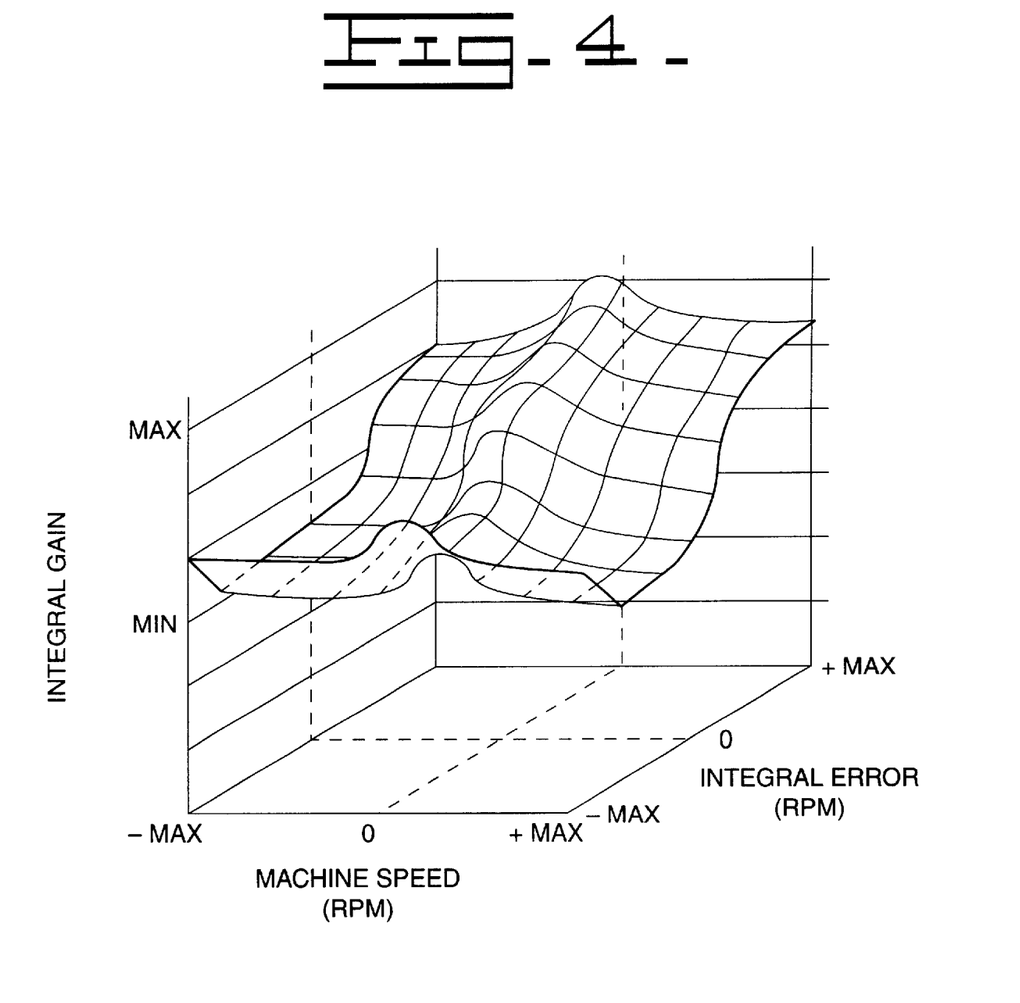
FIG. 4 is a graph of integral gain as a function of machine travel speed and integral error.

Referring now to FIG. 4, there is shown a graph of integral gain values used in a second embodiment of the present invention whereby the feedback controller 110 applies an integral gain to the integral component of the underspeed request signal based on machine travel speed and the integral error, i.e. the difference between the actual engine speed and the first underspeed value. Although the integral gain values are shown as a specific three dimensional surface, the integral gain values may form a number of surfaces where (i) relatively high integral gain values are used for a relatively slow machine travel speeds, (ii) relatively low integral gain values are used for a relatively high forward and reverse machine travel speeds, (iii) relatively high integral gain values are used where there is a high positive integral error, (iv) intermediate integral gain values where there is a high negative integral error, and (v) relatively low integral gain values are used where there is a low positive or negative integral error. In the second embodiment, a three-dimensional look-up table of a type well known in the art is used to store the integral gain values shown in FIG. 4. It should be appreciated that a proportional gain value could also be applied to the proportional component of the underspeed request signal based on the machine travel speed and the proportional error, where the proportional error is the difference between the second underspeed value and the actual engine speed. The proportional gain would either increase or decrease the influence of the proportional component of the underspeed request signal on the command signal.

Figure 5:
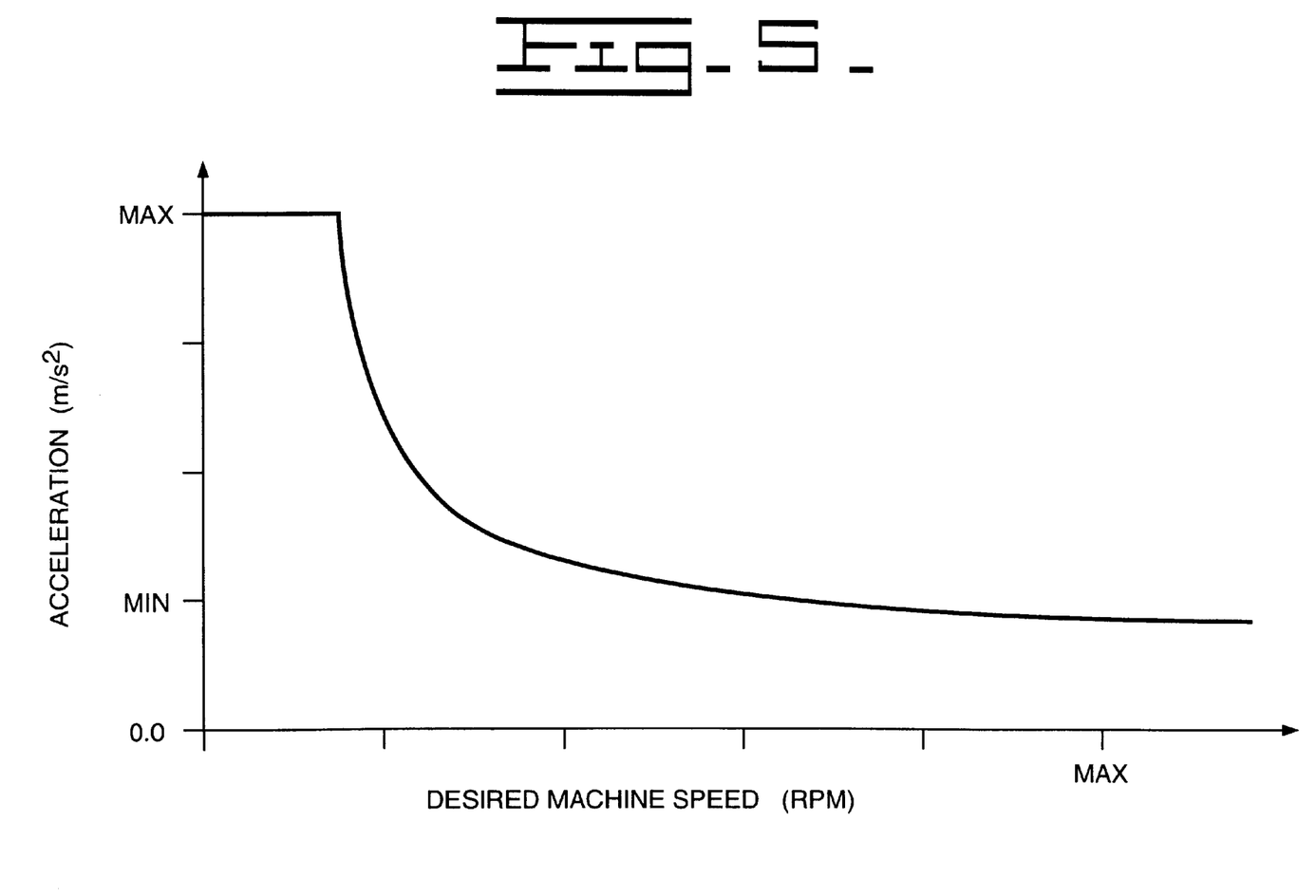
FIG. 5 is a graph of the acceleration limit as a function of desired speed command.

Referring now to FIG. 5, there is shown an acceleration limit which is used to calculate the desired machine speed command. The desired machine speed command is the machine travel speed that the controller 18 would command to reach the requested machine speed without regard to lugging the engine 12 (see FIG. 6). The acceleration curve shown in FIG. 5 is proportional to the maximum available torque output of the engine 12 as the overall transmission ratio varies. Using this acceleration curve, which is proportional to the maximum torque characteristics of the engine 12, to calculate the desired machine speed command ensures that the reasonable loads are applied to the engine 12 as the work machine accelerates toward the desired machine speed command. It should be appreciated that the characteristic curve shown in FIG. 5 could vary significantly to match the torque characteristics of a particular engine 12. For the exemplary engine 12, at low desired machine speeds, the command signals command a higher rate of acceleration whereas at higher desired machine speeds, the command signals command a lower rate of acceleration.

INDUSTRIAL APPLICABILITY

In operation, the controller 18 determines if the engine 12 is lugging, i.e. the engine speed drops below the second underspeed value, and responsively (i) increases or decreases the displacement of the pump 48 and/or the motor 52 and (ii) engage or disengage the appropriate clutches 36, 38, and 40 to change the overall transmission ratio of the work machine. Changing the overall transmission ratio of the work machine reduces the machine travel speed in order to reduce engine load and prevent the engine 12 from lugging. More specifically, using the first embodiment of the present invention, in response to engine speed falling below the first underspeed value, the controller 18 uses aggressive integral gain values to generate command signals which reduce the engine load when the machine travel speed is relatively slow, and moderate integral gain values to generate command signals which reduce engine load when the machine travel speed is relatively high. Alternately, using the second embodiment of the present invention, in response to engine speed falling below the first underspeed value, the controller 18 uses (i) aggressive integral gain values to generate command signals which reduce the engine load when the machine travel speed is relatively slow or when the integral error is a high positive value, (ii) intermediate integral gain values to generate command signals which are used to reduce engine load when the integral error is a large negative value, and (iii) moderate integral gain values to generate command signals which are used to reduce engine load when the machine travel speed is relatively high or the integral error is a small negative or a small positive value. By reducing the engine load needed to propel the work machine, engine power can be applied to other systems loading the engine 12.

Figure 6:
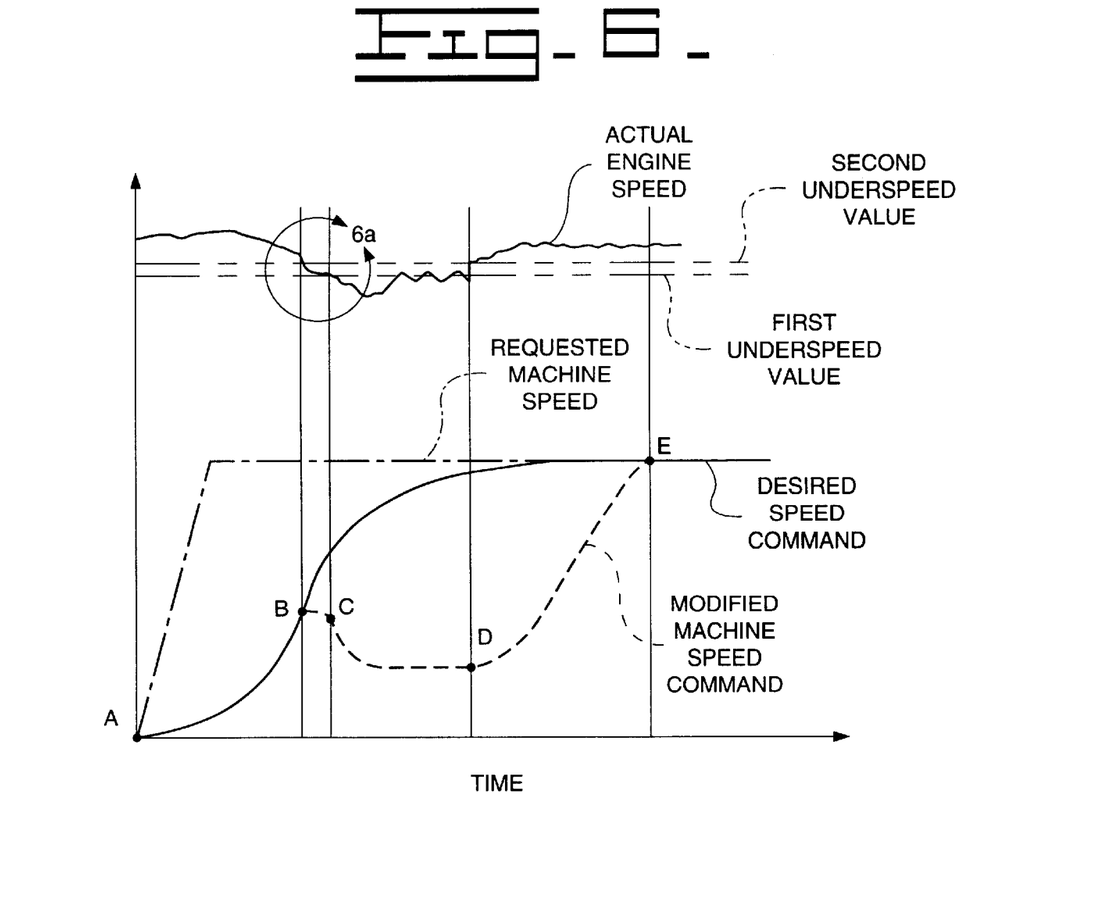
FIG. 6 is a graph of engine speed curve relative to the operation of the underspeed control.
Figure 6A:
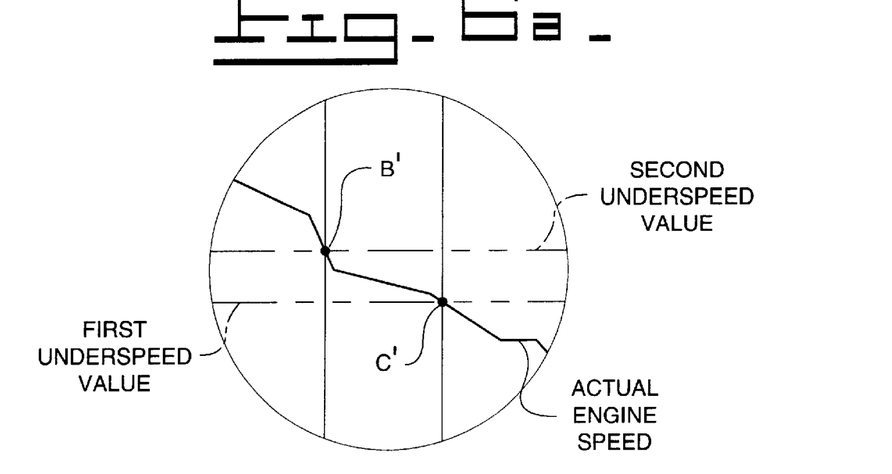
FIG. 6A is an exploded view of a portion of the curve of FIG. 6 showing the actual engine speed relative to a first underspeed value and a second underspeed value.

Reference is now made to FIG. 6 which gives an example of the operation of the underspeed control 100, shown in FIG. 2, associated with the present invention in comparison with the desired machine speed command and the modified machine speed command versus engine speed. The described underspeed control 100 operates intermittently and is activated in response to satisfying one of two conditions: (1) the engine underspeeding, e.g., the engine speed falling below the second undespeed value or (2) the integral term of the proportional plus integral feedback controller being a positive non-zero value. Referring to the portion of the curve from points A to B on FIG. 6, the underspeed control is shown as being de-activated. However, once the engine speed falls below the second underspeed value (shown as point B' in FIG. 6A), then the engine is said to be lugging because of an increased load which causes the engine speed to fall below the second underspeed value thereby activating the underspeed control 100.

When the underspeed control is active, the controller 18 applies integral gain values from either the first embodiment of the present invention, shown in FIG. 3, or the second embodiment of the present invention, shown in FIG. 4, to the integral component of the underspeed request signal to vary the overall ratio of the transmission 10 which commands the work machine to follow the modified machine speed command between points B and E. In the exemplary embodiments, a constant proportional gain is applied to the proportional component of the underspeed request signal. However, the proportional gain could be mapped with respect to the machine speed, similar to the integral gain shown in FIG. 3 or mapped with respect to the machine speed and proportional error similar to the integral gain shown in FIG. 4. Commanding the modified machine speed command between points B and E reduces the load on the engine 12 and decreases the amount of lugging experienced by the engine 12.

Once the load on the engine 12 decreases, (shown as point D on the dashed curve), then the underspeed control remains active until the modified machine speed command of the work machine reaches the desired speed command (shown as point E). After the modified machine speed command reaches the desired speed command, the underspeed control is de-activated. The transition between points D and E is referred to as "unwinding" the integral term of the underspeed request signal.

The acceleration limits shown in FIG. 5 are applied to the desired machine speed command to ensure that the loads placed on the engine 12 are proportional to the maximum torque characteristics of the engine 12. Applying acceleration limits to the desired machine speed command which are proportional to the maximum torque characteristics of the engine 12 ensures that reasonable load are placed on the engine 12.

It should be appreciated that it is advantageous for the underspeed control 100 to use independent underspeed values for the proportional component of the underspeed request signal and the integral component of the underspeed request signal. For example, the proportional component of the underspeed control 100 could be activated upon the engine speed falling below the second underspeed value, while the integral component could be activated upon the engine speed falling below the first underspeed value, where the second underspeed value is greater than or equal to the first underspeed value. The second underspeed value enables the controller 18 to "predict" that the load is coming and, being that it is a proportional control, prevent large undershooting of the engine speed. On the other hand, varying the overall transmission ratio based on the integral component provides zero steady state error on engine speed. Thus, the first underspeed value must be chosen at the particular engine speed where the engine 12 runs at peak power under a given load condition. Therefore, varying the transmission ratio based on the integral component of the underspeed request signal forces the engine to run at peak power under a given load condition.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for controlling load on an engine, comprising:
   a continuously variable transmission driven by the engine;
   an engine speed sensor being adapted to sense the output speed of the engine and produce an engine speed signal indicative of the engine output speed;
   a travel speed sensor being adapted to sense the travel speed of the machine and produce a travel speed signal indicative of the machine travel speed; and
   an electronic controller operative to (i) activate a modified machine speed command responsive to the engine speed falling below an underspeed value, and (ii) direct the modified machine speed command toward a subsequent underspeed value,
   wherein the load on the engine is decreased in response to activation of the modified machine speed command and a transmission ratio of the continuously variable transmission is modified based on the subsequent underspeed value to obtain an engine performance condition.

2. The apparatus of claim 1, wherein the electronic controller is further operable to supply an integral gain value based on the machine travel speed.

3. An apparatus for controlling load on an engine, comprising:
   a continuously variable transmission driven by the engine;
   an engine speed sensor being adapted to sense the output speed of the engine and produce an engine speed signal indicative of the engine output speed;
   a travel speed sensor being adapted to sense the travel speed of the machine and produce a travel speed signal indicative of the machine travel speed; and
   an electronic controller operable to (i) compare the engine speed signal to a first underspeed value and produce an integral error signal indicative of the difference between the engine speed signal and the first underspeed value, (ii) modify the integral error signal through a proportional plus integral feedback controller to produce an underspeed request signal, and (iii) produce a command signal based on the underspeed request signal,
   wherein the command signal is used to control the transmission ratio of the continuously variable transmission so as to control the load on the engine,
   wherein high integral gain values are used for relatively slow machine travel speeds; and
   low integral gain values are used for relatively high machine travel speed decreases.

4. The apparatus of claim 1, the continuously variable transmission includes a variable displacement pump,
   wherein the displacement of the variable displacement pump is varied in response to receiving a command signal from the electronic controller.

5. An apparatus for controlling load on an engine, comprising:
   a continuously variable transmission driven by the engine, the continuously variable transmission includes a variable displacement motor;
   an engine speed sensor being adapted to sense the output speed of the engine and produce an engine speed signal indicative of the engine output speed;
   a travel speed sensor being adapted to sense the travel speed of the machine and produce a travel speed signal indicative of the machine travel speed; and
   an electronic controller operable to (i) compare the engine speed signal to a first underspeed value and produce an integral error signal indicative of the difference between the engine speed signal and the first underspeed value, (ii) modify the integral error signal through a proportional plus integral feedback controller to produce an underspeed request signal, and (iii) produce a command signal based on the underspeed request signal,
   wherein the command signal is used to control the transmission ratio of the continuously variable transmission so as to control the load on the engine,
   wherein the displacement of the variable displacement motor is varied in response to receiving the command signal.

6. An apparatus for controlling load on an engine, comprising:
   a continuously variable transmission driven by the engine;
   an engine speed sensor being adapted to sense the output speed of the engine and produce an engine speed signal indicative of the engine output speed;
   a travel speed sensor being adapted to sense the travel speed of the machine and produce a travel speed signal indicative of the machine travel speed; and
   an electronic controller operable to (i) compare the engine speed signal to a first underspeed value and produce an integral error signal indicative of the difference between the engine speed signal and the first underspeed value, (ii) modify the integral error signal through a proportional plus integral feedback controller to produce an underspeed request signal, and (iii) produce a command signal based on the underspeed request signal, wherein the command signal is used to control the transmission ratio of the continuously variable transmission so as to control the load on the engine, wherein the command signal is produced by subtracting the underspeed request signal from a desired machine speed command.

7. The apparatus of claim 6, wherein the desired machine speed command is limited by a predetermined acceleration limit, and the predetermined acceleration limit varies with the desired machine speed command.

8. An apparatus for controlling load on an engine, comprising:

a continuously variable transmission driven by the engine;

an engine speed sensor being adapted to sense the output speed of the engine and produce an engine speed signal indicative of the engine output speed;

a travel speed sensor being adapted to sense the travel speed of the machine and produce a travel speed signal indicative of the machine travel speed; and an electronic controller operable to (i) compare the engine speed signal to a first underspeed value and produce an integral error signal indicative of the difference between the engine speed signal and the first underspeed value, (ii) modify the integral error signal through a proportional plus integral feedback controller to produce an underspeed request signal, and (iii) produce a command signal based on the underspeed request signal, wherein the command signal is used to control the transmission ratio of the continuously variable transmission so as to control the load on the engine, wherein the electronic controller is further operable to (i) compare the engine speed signal to a second underspeed value and produce an proportional error signal indicative of the difference between the engine speed signal and the second underspeed value, (ii) modify the integral error signal through a proportional plus integral feedback controller to produce an integral component of the underspeed request signal, and (iii) modify the proportional error signal through a proportional plus integral feedback controller to produce a proportional component of the underspeed request signal, and the second underspeed value is at an engine speed that is greater than or equal to the engine speed of the first underspeed value.

9. A method for controlling a load on an engine associated with a continuously variable transmission, comprising the steps of:

sensing the engine output speed and producing an engine speed signal indicative of the engine output speed;

sensing the travel speed of the machine and producing a travel speed signal indicative of the machine travel speed;

activating a modified machine speed command within an electronic controller responsive to the engine speed falling below an underspeed value; and directing the modified machine speed command toward a subsequent underspeed value, wherein the load on the engine is decreased in response to the activation of the modified machine speed command and the transmission ratio of the continuously variable transmission is modified based on the subsequent underspeed value to obtain an engine performance condition.

10. The method of claim 9, wherein the electronic controller comprises a proportional plus integral feedback controller.

11. The method of claim 9, further comprising the steps of:

comparing the engine speed signal to a first underspeed value and producing an integral error signal indicative of the difference between the engine speed signal and the underspeed value;

determining an integral gain value based on the machine travel speed signal;

modifying the integral error signal through a proportional plus integral feedback controller to produce an underspeed request signal; and generating a command signal based on the underspeed request signal, the generating step further comprises the step of subtracting the underspeed request signal from a desired machine speed command to produce the command signal.

12. The method of claim 9, further including the steps of:

de-activating the modified machine speed command in response to the modified machine speed command reaching a desired machine speed command.

13. A method for controlling a load on an engine associated with a continuously variable transmission, comprising the steps of:

sensing the engine output speed and producing an engine speed signal indicative of the engine output speed;

sensing the travel speed of the machine and producing a travel speed signal indicative of the machine travel speed;

comparing the engine speed signal to a first underspeed value and producing an integral error signal indicative of the difference between the engine speed signal and the first underspeed value;

determining an integral gain value based on the machine travel speed signal;

modifying the integral error signal through a proportional plus integral feedback controller to produce an underspeed request signal;

generating a command signal based on the underspeed request signal;

controlling the transmission ratio of the continuously variable transmission with the command signal so as to regulate the load on the engine; and activating the proportional term of the proportional plus integral feedback controller in response to the engine speed falling below a second underspeed value, wherein the second underspeed value is at a higher engine speed than the first underspeed value.

14. An apparatus for controlling load on an engine, comprising:

a continuously variable transmission driven by the engine;

an engine speed sensor being adapted to sense the output speed of the engine and produce an engine speed signal indicative of the engine output speed;

a travel speed sensor being adapted to sense the travel speed of the machine and produce a travel speed signal indicative of the machine travel speed; and an electronic controller operative to (i) activate a modified machine speed command responsive to the engine speed falling below an underspeed value, (ii) direct the modified machine speed command toward a subsequent underspeed value, and (iii) manipulate the modified machine speed command based on predetermined gain data and the gain data being based on machine travel speed, wherein the load on the engine is decreased in response to activation of the modified machine speed command and a transmission ratio of the continuously variable transmission is modified based on the subsequent underspeed value to obtain an engine performance condition.

15. The apparatus of claim 14, the continuously variable transmission includes a variable displacement pump, wherein the displacement of the variable displacement pump is varied in response to receiving a command signal from the electronic controller.

16. The apparatus of claim 14, the continuously variable transmission includes a variable displacement motor, wherein the displacement of the variable displacement motor is varied in response to receiving a command signal from the electronic controller.

17. The method of claim 14 wherein the electronic controller is operable to compare the engine speed signal to a first underspeed value and produce an integral error signal indicative of the difference between the engine speed signal and the underspeed value, (ii) supply an integral gain value based on the machine travel speed and the integral error signal, (iii) modify integral error signal through a proportional plus integral feedback controller to produce an underspeed request signal, and (iv) produce a command signal based on the underspeed request signal, the command signal is produced by subtracting the underspeed request signal from a desired machine speed command.

18. The apparatus of claim 17, wherein the desired speed command is limited by a predetermined acceleration limit, and the predetermined acceleration limit varies with desired machine speed command.

19. An apparatus for controlling load on an engine, comprising:

a continuously variable transmission driven by the engine;

an engine speed sensor being adapted to sense the output speed of the engine and produce an engine speed signal indicative of the engine output speed;

a travel speed sensor being adapted to sense the travel speed of the machine and produce a travel speed signal indicative of the machine travel speed; and an electronic controller operable to (i) compare the engine speed signal to a first underspeed value and produce an integral error signal indicative of the difference between the engine speed signal and the first underspeed value, (ii) supply an integral gain value based on the machine travel speed and the integral error signal, (iii) modify integral error signal through a proportional plus integral feedback controller to produce an underspeed request signal, and (iv) produce a command signal based on the underspeed request signal, wherein the command signal is used to control the transmission ratio of the continuously variable transmission so as to control the load on the engine, wherein high integral gain values are used for relatively high positive integral errors; low integral gain values are used for low negative integral errors; and intermediate integral gain values are used for high negative integral errors.

20. A method for controlling a load on an engine associated with a continuously variable transmission, comprising the steps of:

sensing the output speed of the and producing an engine speed signal indicative of the engine output speed;

sensing the travel speed of the machine and producing a travel speed signal indicative of the machine travel speed;

activating a modified machine speed command responsive to the engine speed falling below an underspeed value;

directing the modified machine speed command toward a subsequent underspeed value; and manipulating the modified machine speed command based on predetermined gain data and the gain data being based on machine travel speed, wherein the load on the engine is decreased in response to activation of the modified machine speed command and a transmission ratio of the continuously variable transmission is modified based on the subsequent underspeed value to obtain an engine performance condition.

21. The method of claim 20, further including the step of operating proportional plus integral feedback control within the controller in response to the engine speed falling below the underspeed value.

22. The method of claim 20, further comprising the steps of: comparing the engine speed signal to the underspeed value and producing an integral error signal indicative of the difference between the engine speed signal and the underspeed value;

determining an integral gain value based on the machine travel speed and the integral error signal;

modifying the integral error signal through a proportional plus integral feedback controller to produce an underspeed request signal;

generating a command signal based on the underspeed request signal; and controlling the transmission ratio of the continuously variable transmission with the command signal so as to regulate the load on the engine, the generating step further comprises the step of subtracting the underspeed request signal from a desired machine speed command to produce the command signal.

23. A method for controlling a load on an engine associated with a continuously variable transmission, comprising the steps of:

sensing the output speed of the and producing an engine speed signal indicative of the engine output speed;

sensing the travel speed of the machine and producing a travel speed signal indicative of the machine travel speed;

comparing the engine speed signal to a first underspeed value and producing an integral error signal indicative of the difference between the engine speed signal and the first underspeed value;

determining an integral gain value based on the machine travel speed and the integral error signal;

modifying the integral error signal through a proportional plus integral feedback controller to produce an underspeed request signal;

generating a command signal based on the underspeed request signal;

controlling the transmission ratio of the continuously variable transmission with the command signal so as to regulate the load on the engine; and activating a proportional term of the proportional plus integral feedback controller in response to the engine speed falling below a second underspeed value and activating the integral term of the proportional plus integral feedback controller in response to the engine speed falling below the first underspeed value, wherein the second underspeed value is at a higher engine speed than the first underspeed value.

24. A method for controlling a load on an engine associated with a continuously variable transmission, comprising the steps of:

sensing the output speed of the and producing an engine speed signal indicative of the engine output speed;

sensing the travel speed of the machine and producing a travel speed signal indicative of the machine travel speed;

comparing the engine speed signal to a first underspeed value and producing an integral error signal indicative of the difference between the engine speed signal and the first underspeed value;

determining an integral gain value based on the machine travel speed and the integral error signal;

modifying the integral error signal through a proportional plus integral feedback controller to produce an underspeed request signal;

generating a command signal based on the underspeed request signal;

controlling the transmission ratio of the continuously variable transmission with the command signal so as to regulate the load on the engine;

activating the proportional plus integral feedback controller in response to the engine speed falling below the second underspeed value; and de-activating the underspeed control in response to a modified machine speed command reaching the desired speed command.

* * * * *